UNITED STATES PATENT OFFICE.

CARLETON ELLIS, OF MONTCLAIR, NEW JERSEY.

PROCESS OF HYDROGENATION.

1,266,782.  Specification of Letters Patent.  Patented May 21, 1918.

No Drawing.  Application filed November 23, 1914. Serial No. 873,507.

*To all whom it may concern:*

Be it known that I, CARLETON ELLIS, a citizen of the United States, and a resident of Montclair, in the county of Essex and State of New Jersey, have invented certain new and useful Improvements in Processes of Hydrogenation, of which the following is a specification.

My present invention relates to effecting catalytic reactions, such as the hydrogenation of oil for example, by use of catalyzers and relates in particular to the use of particular catalytic materials which include a finely divided material comprising a precipitated agent containing nickel or similar catalytic substance with silica or silicon.

This application is in part a continuation of matter disclosed in my copending application 686,988 (now U. S. Patent 1,217,118) particularly as to the use of colloidal silica in combination with nickel and other analogous mixtures of these two materials.

In the preparation of catalyzers for the hardening of oil and the like, it is common practice to support the metal (or other metallic material employed) on a base or carrier, such as inert supporting material like pumice or kieselguhr. Owing to the great irregularity in size of the particles obtained by crushing pumice stone or by using kieselguhr, which after weathering often contains particles which are very variable in size, there is some objection to the use of these supporting materials. By the present invention an extending material which is in the nature of a precipitated body is or may be employed. For this purpose, silica precipitated as a product of great fineness and of a substantial degree of uniformity in size may be used to extend, for example nickel, or similar catalyzers or the oxid or sub-oxid of this or other catalytic metals or mixtures thereof to form an agent capable under the proper conditions of accomplishing rapid catalytic action. Thus, various metals, such as the base metals cobalt, copper, iron and the like (in addition to the nickel above referred to) or their oxids, hydroxids, carbonates or other compounds or derivatives thereof may be used in a similar manner. The precipitated material may be washed to remove any soluble material and may then be used for oil hardening without previous reduction, or the material may be first reduced by heating in an atmosphere of hydrogen. Prior to drying the material, after the precipitation has been effected, if desired a small quantity of a palladium salt may be added, so as to secure a joint action of both nickel and palladium. The dried material may be ignited in a current of hydrogen or other suitable reducing gas. Similarly, other nickel salts, such as nickel fluosilicate may be mixed with lime or other base to effect the required chemical change and precipitation, which accomplishes the production of an extender having the qualities set forth above and others. The use of material precipitated in this manner affords a catalyzer which has better distributing powers and is more suitably suspended in oil than is the case with ground pumice and the like. Another objection to the use of natural mineral material—one which seems insignificant but actually from the manufacturing standpoint is of importance, in the handling of large quantities of catalyzer during the reducing operations and so forth—is that often it is desired to employ agitators or stirring devices and it is found that with pumice and the like the working parts of the apparatus quickly become scored and abraded. In a similar manner in the hydrogenation of the oil when stirrers are employed the erosive mineral material affords a scoring action which is oftentimes very serious, causing leakage of the oil and frequent replacement of the working parts and oftentimes causing a considerable loss of hydrogen gas. Finely-divided earths not infrequently contain particles of quartz or other hard substances, causing a pronounced scoring action.

In the present instance it becomes possible to prepare an extended catalyzer without the danger of the presence of such abrasive material and furthermore the suspending or floating qualities of the material are particularly good. As an illustration of a catalyzer of this type the following will serve: Silicon tetrafluorid is prepared by heating a mixture of calcium fluorid, sand and sulfuric acid and the gases evolved are led into water where the silica precipitates in a gelatinous form as a hydrated colloidal silicic acid gel. When a sufficient amount of the latter has formed it is collected, filtered, washed and dried. In drying, I prefer to apply only a gentle heat so as not to completely remove the moisture or completely destroy the colloidal gel form or condition of the silicic acid. A very light powdery or feathery product is obtained which is mixed with a solution of nickel nitrate and the product is dried, ignited and reduced. Or nickel hydrate is precipitated from a nickel solution by the addition of suitable precipitant such as alkali solution. This material is then washed and dried and employed in combination with silica for catalytic purposes. Or, it first may be reduced by hydrogen. Again, the precipitated silica may be mixed with a solution of nickel nitrate, dried and ignited, so as to give approximately 20% of nickel with the silica. This material when reduced in a current of hydrogen at a moderate temperature is found to be a very effective catalytic agent in hardening oils.

The activity of the catalyzer is perhaps due in part to the fact that by combination with silica to a greater or less extent occurring under the conditions of preparation, a silicate of nickel is formed which is of itself a hydrogen carrier or acts to accelerate the activity of any reduced nickel which may be present.

It is possible therefore to separately prepare the precipitated extending material or the two or more ingredients entering into this product may be co-precipitated so that a most intimate contact, mixture or combination of the two bodies is secured.

Nickel silicid catalysts and the use of the same in hydrogenation are not specifically claimed herein, but form the subject matter of my copending applications 115,113, filed Aug. 3, 1916, and 121,494, filed September 21, 1916, (now Patent No. 1,255,590.)

What I claim is:

1. A catalytic material comprising a catalytically active finely divided metal extended by precipitated non-abrasive silica.

2. A catalytic material comprising finely divided nickel extended by precipitated non-abrasive silicon-containing material.

3. A catalytic agent comprising grains containing non-abrasive precipitated silica-containing material and metallic nickel interspersed therethrough.

4. A catalyst comprising an intimate mixture of finely divided nickel and non-abrasive silica-containing material.

5. A catalyst comprising an intimate mixture of finely divided nickel and non-abrasive precipitated silica.

6. In the chemical affixation of hydrogen to substances, the step of treating the substance to be hydrogenated with hydrogen in the presence of a catalytic body comprising a non-abrasive silicon-containing material associated with a metal-containing substance capable of serving as a hydrogenating catalyst.

7. The process of effecting reactions between a hydrogen and substance capable of reacting therewith, which process comprises bringing the said substances together in the presence of a catalytic body comprising a siliceous finely divided material, in intimate association with nickel, said catalytic body being free from abrasive material.

8. A process of effecting reactions which comprises bringing the reactive substances together in the presence of a catalyst in a non-abrasive condition, said catalyst containing silica and nickel, and at least a part of which is in a colloidal condition.

9. A process which comprises subjecting a material to be hydrogenated, and hydrogen, to the action of a catalytic body comprising nickel and silica, both in a non-abrasive condition, and being associated with other metal containing material having catalytic properties.

10. A process which comprises subjecting a material to be hydrogenated, and hydrogen, to the action of a catalytic body comprising nickel and silica, both in a non-abrasive condition, and being associated with a metal of the palladium group.

11. A process which comprises subjecting a material capable of reacting with hydrogen, to the action of hydrogen in the presence of a catalyzer comprising colloidal silica and nickel.

12. A process which comprises subjecting a material capable of reacting with hydrogen, to the action of hydrogen in the presence of a non-abrasive catalyzer comprising nickel and silica.

Signed at Montclair, in the county of Essex and State of New Jersey, this 21st day of November, A. D. 1914.

CARLETON ELLIS.

Witnesses:
A. A. WELLS,
B. M. ELLIS.